Dec. 31, 1968    F. H. BRATTON ET AL    3,419,361

HYDROGEN GENERATING SYSTEM

Filed Nov. 15, 1965

INVENTORS
FRANCIS H. BRATTON,
HAROLD I. REYNOLDS
BY *Meyers & Peterson*

ATTORNEYS

United States Patent Office 3,419,361
Patented Dec. 31, 1968

3,419,361
HYDROGEN GENERATING SYSTEM
Francis H. Bratton and Harold I. Reynolds, Northfie'd, Minn., assignors to G. T. Schjeldahl Company, Northfield, Minn., a corporation of Minnesota
Filed Nov. 15, 1965, Ser. No. 507,748
9 Claims. (Cl. 23—281)

The present invention relates generally to a method and apparatus for preparing hydrogen for use, for example, in a inflatant system and which may be used as a self-initiated, self-sustaining reactant system for producing hydrogen. The system is adaptable for use in inflating enclosures such as tethered or free floating balloon packages or the like, the system employing a controllable decomposing hydrogen liberating inflatant composition which inflatant composition comprises a controllable self-sustaining reactant mixture of an endothermic and an exothermic compound.

Hydrogen gas may be used to inflate site markers, or other balloon systems, and may be obtained from certain chemicals which readily release hydrogen upon contact with water or upon application of heat. For example, certain hydrides, such as, for example, the alkaline earth hydrides yield hydrogen when placed in physical contact with water; however, these systems being sensitive to the presence of water are somewhat dangerous to handle, since the release of hydrogen may occur uncontrollably and may also occur relatively rapidly and prematurely. The byproducts of such a system are also generally dangerous or corrosive in nature. The system of the present invention utilizes a substantially anhydrous, nonaqueous, stable composition which may be heat activated to produce hydrogen. The system utilizes a unique combination of exothermically and endothermically reacting chemicals which may be blended and packaged to control reaction temperatures and produce nascent molecular hydrogen at near-ambient conditions. Hydrogen is also desirable for use in connection with fuel cells and also have application for a wide variety of other purposes.

Briefly, according to the present invention the hydrogen generation or inflation system consists of a blend of reactants of hydrogen containing hydrogen liberating chemicals or compounds, one or more of these compounds being exothermically decomposable, along with one or more endothermically decomposable compounds; the arrangement being such that the decomposition heats of reaction of the blend is self-sustaining and controlled, and the rapid evolution of hydrogen occurs at a relatively low temperature, this evolution occurring at a temperature substantially lower than the temperature obtained or reached for the decomposition of the exothermic material alone. Furthermore, a method of packaging these hydrogen-containing compounds is provided, the packaging method being such that the hydrogen is released controllably when the system is properly initiated or stimulated. Generally the exothermically decomposable compounds selected for hydrogen gas generation are selected from a group of preferably solid, powdered, compactable materials, which are for example, the reaction products of hydrazine and borane. Also suitable as exothermically decomposable compounds are a solid and a liquid material which are the reaction products of ammonia and borane. The exothermic compounds take the generalized formula of $R(R^1)_n$ where R is selected from the group consisting of hydrazine, $N_2H_4$, hydrazine, $N_2H_2$, and ammonia $NH_3$; $R^1$ is $BH_3$, and $n$ is a positive integer between 0 and 2. These compounds appear to be the only known self-sustaining hydrogen generating compounds which do not require combination with aqueous solvents. The endothermically decomposable compound is preferably an alkali metal borohydride such as lithium borohydride.

When one or a mixture of the above suggested boranes, which decompose exothermically, are blended with an alkali metal borohydride, such as lithium borohydride, $LiBH_4$, the net heat of reaction upon decomposition of the reactant mass is substantially less than the heat of reaction of the exothermically decomposing borane compounds alone. This occurs because the heat of reaction of the decomposition of lithium borohydride is endothermic in nature. The decomposition of lithium borohydride requires a substained source of thermal energy which may be derived, for example, from the decomposition of an exothermically decomposable borane, for example hydrazine-bisborane.

By selecting a blend of certain specific molar ratios of the exothermically decomposable borane compounds utilized with the lithium borohydride, the net heat and rate of reaction of the blend can be varied and controlled to certain predetermined levels. A recommended blend based generally upon a net heat of reaction of the decompositions of lithium borohydride and hydrazine-bisborane would be 2 to 3 moles of $LiBH_4$ to one mole $N_2H_4(BH_3)_2$. In calculating overall temperature rise, of the system, one considers the heat capacity of the packaging materials which could be utilized, such as the enclosure for example and inert chemical byproducts of the reaction, the loss of heat due to the isothermal and adiabatic expansion of the hydrogen and other gases present. It is concluded that the overall temperature rise above the ambient for the evolved hydrogen and for the entire system is modest. Reactant blends or ratios of two moles of $LiBH_4$ and one mole of $N_2H_4(BH_3)_2$ have been successful with rapid cooling of the evolved hydrogen after leaving the reaction mass.

If desired, initial ignition of thee blends may be accomplished by a heat source such as a resistance heater, fabricated from Nichrome wire for example, Pyrofuse, an electrical squib, a mechanical squib, or open flame derived from a torch, match, candle or the like. In addition, ordinary percussion caps may be utilized if desired. Ordinary detonating devices may not initiate the reaction, since an elevated temperature in the range from about 250° C. to 300° C. is normally required to initiate the reaction for most blends. Also, in order to enhance the decomposition reaction, the blend may be graded to provide a more highly exothermically composition at the beginning portion than at the remainder of the material to be decomposed.

These hydrogen generating materials may be encapsulated or otherwise packaged in such a manner that they may be adapted as a convenient source of predetermined quantities of hydrogen for use in school or commercial laboratories, as well as for the inflation of lighter than air balloons or other inflatables. If desired, the materials can be properly blended in certain predetermined amounts, or may be mixed with certain binders to facilitate handling or specific reaction rates, and specific compression or extrusion operations may be utilized to form shapes to provide acceptance into predetermined container forms or the like. In one application of this invention, the material may be packaged within a tuburlar porous or otherwise gas permeable insulating material such as braided fiber glass, asbestos sleeve, high temperature porous open-cell synthetic foams. Lead alloy or plastic sheathing or the like may also be used in combination with these other porous materials, if desired. The encapsulated material may then be attached to the inner surface or wall of an inflatable structure such as a normal lighter-than-air balloon or the like fabricated from Mylar or other film material, or may be supported or contained in a suitable canister or container with inflation connections to the device to be inflated. This encapsulated material may also be suspended from the inner film wall by means of a supporting web or the like, if desired. When provided with a suitable reaction initiating device, the hydrogen evolution may be obtained, as required.

Therefore, it is an object of the present invention to provide an improved hydrogen generating system which may be utilized to produce a hydrogen fill gas for an inflatable envelope or other structure.

It is yet a further object of the present invention to provide an improved technique and apparatus for providing a source of hydrogen which does not require the availability of water as a medium for generating the hydrogen.

It is yet a further object of the present invention to provide an improved apparatus and technique for conveniently generating hydrogen on a self-sustaining basis without creating excessively high temperatures in the reactant system.

It is still a further object of the present invention to provide an improved technique and apparatus capable of generating hydrogen at a rate and quantity which renders the system sufficiently light in weight so as to be self-buoyant in nature.

Other and further objects of the present invention will become apparent to those skilled in the art upon a study of the following specification, appended claims, and accompanying drawings, wherein:

Figure 3:
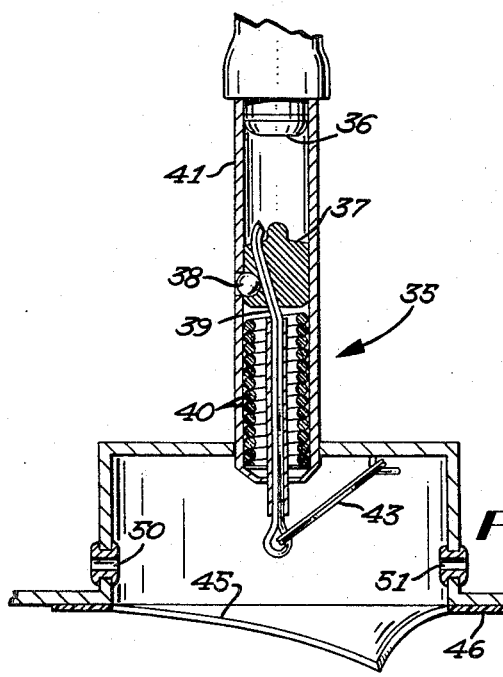
Figure 4:

FIGURE 3 is a detail view, partially in section, showing a suitable detonating appartaus for initiating the decomposition reaction of a suitable blend of hydrogen generating materials provided and disposed in the canister device, and the detonating apparatus being partially actuated; and FIGURE 4 is a detail elevation view, showing a short length of the hydrogen generating materials in tubular encapsulated form with the encapsulated and encapsulating material being partially broken away.

Figure 1:
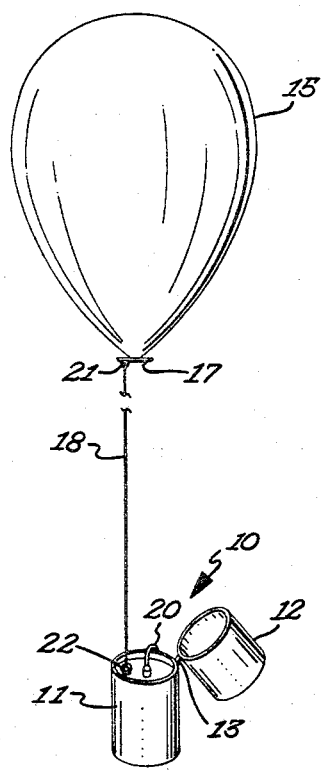
FIGURE 1 is a perspective view, of an inflatable structure after its inflation and release from a suitable canister device.

In accordance with the preferred modification of the present invention, the inflation system generally designated 10 includes a canister enclosure or the like, the canister being fabricated from a pair of separable sections including a lower section 11 and an upper section 12. These sections are held or otherwise retained together by any suitable sealing means or the like, such as the hermetic tape bond or tear strip such as at 13. The canister section 11 and 12 may be fabricated from any suitable material, but preferably are fabricated from seamless round cylinders of high tensil material, a suitable material being high tensil chrome molybdenum steel, In the interior of the canister, particularly in the confines of the upper portion 12, a balloon 15 is normally disposed in collapsed form. This ballon is shown schematically in collapsed disposition in the canister in FIGURE 2, but is shown in inflated disposition in FIGURE 1. Obviously the balloon 15 may be folded directly upon itself, if appropriate for the particular inflatable being utilized. The manner of inflating the balloon structure 15 by means of the hydrogen generating system will be provided in greater detail hereinafter.

Figure 2:
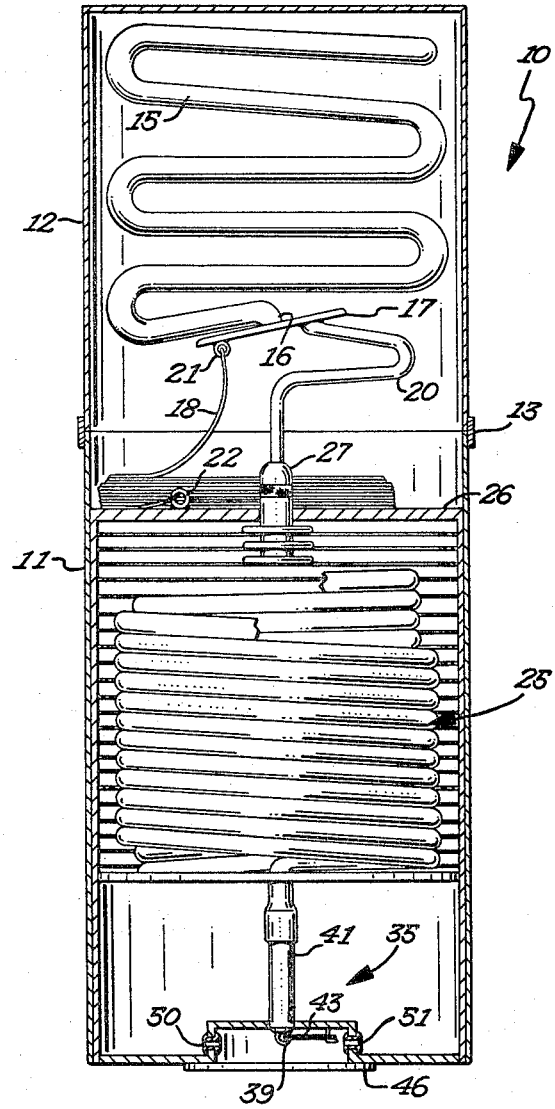
FIGURE 2 is a detail view, partially in vertical section, taken through the interior of the canister device illustrated in FIGURE 1, and showing hydrogen generating system and the inflatable member retained therein, the inflatable member being in collapsed form.

With specific reference to FIGURE 2 of the drawings, the balloon 15 is coupled at its open end 16 to a hollow inflation plate member 17. This inflation plate 17 is provided with a tether line 18 coupled thereto, and is furthermore coupled to a hydrogen inflating tube 20. In this regard, the tether line 18 is coupled at one of its ends to an eyelet member 21 secured to the inflatable balloon along plate 17, and at its other end to any eyelet or anchor member 22 secured to the canister frame. The inflation tube 20 is in communication with the interior of the balloon 15 through the inflation plate 17 and is also in communication with the hydrogen generating system generally designated 25. The hydrogen generating system 25 is confined within the enclosure cyllinder 26, this cylinder having appropriate tensile strength for resisting moderate pressures of confined hydrogen. A suitable filtering and cooling valve or member 27 provides communication between the hydrogen generating system 25 within the cylinder 26, and the inflation tube 20. Hydrogen is generated in this system in the manner as hereinafter set forth in detail.

While hydrogen can be generated in a variety of manners, such as by the chemical reaction between a metal and an acid, or by the reaction of water with a catalyzed metal hydride, an anhydrous or dry system using materials which react by heat or thermal energy alone is clearly advantageous. Specifically in the preferred modification or aspect of the present invention, a controlled self-sustaining reaction is possible wherein a substantial quantity of hydrogen will be made available without requiring elaborate or excessive precautions, or unsual equipment.

The hydrogen generating system generally designated 25 includes a hydrogen generating or liberating composition formed in tubular configuration and covered by a suitable sheath or the like. While "tubular" is herein employed in the description of the "cylindrical tubular" member 30, the term "tubular" as employed in this specification and claims is intended to incompass any geometrical configuration having any cross-sectional form including round, elliptical, square, rectangular and also other multisided configurations. With reference to FIGURE 4, the hydrogen liberating composition is shown at 30, with the sheathing being shown in separate coaxially arranged layers, the inner layer being a low melting, such as for example antimony-lead alloy encasement, the outer layer being a porous nature of the glass braid will permit the hydrogen gas to escape into the interior of the chamber 26 through filter 27 and through inflation tube 20 and thereby fill the balloon. It is not essential that the material be encapsulated, and as an alternative, pelletized shapes in a variety of forms such as cylindrical, torroidal, cubical, rectangular parallelopiped or the like may be employed.

The controlled reaction of the hydrogen generating or liberating substance 30 can be initiated by a plurality of different techniques. For example, a mechanical squib such as shown in FIGURE 3 at 35 may be utilized to establish initial ignition of the reactant system. Here, a percussion cap of a type which is now widely commercially available is shown at 36, and is struck by a rigid mechanical ram 37 when ignition is desired. The ram 37 is preferably metallic in nature, and is retained in place by the combination of the locking ball 38 and the removable flexible pin member 29. The pin 29 retains the precompressed spring 40 in place within the tubular cylinder 41. Upon removal of the pin 39 by means of a pull on the lanyard 43, as illustrated partially performed in FIGURE 3, the coiled spring 40 may be permitted to exert a shock force on the member 37. Of course, the initiating system 35 is sealed within the confines of the lower portion 11 of the canister, and lanyard 43 along with the exposed portion of the pin 39 is preferably recessed within the system and protected mechanically by means of a protective shield covering as at 45. Shield 45 is sealed in place by any suitable means, such as the tape or tear strip shown at 46. In its design aspects, the mechanical squib may be made resistant to various degrees of shock. For example, the apparatus disclosed in FIGURE 3 may be readily and conveniently designed to be resistant to a shock of 20 G's, which is sufficient to provide a wide margin of safety against accidental balloon inflation in the event the canister is dropped.

The enclosure 26 is preferably prepared in order that it may be flushed of any undesired atmosphere, and thereafter filled with a suitable inert or inactive atmosphere such as nitrogen or the like. For this purpose, a suitable inlet and outlet valve system as shown at 50 and 51 respectively, may be provided. When the apparatus is initially packed for use, the assembly is treated in order to provide such a suitable inert atmosphere within the confines of the enclosure 26.

When ignition is desired for the reactive sublimation of the hydrogen generating material, the lanyard 43 is pulled and the member 37 is caused to strike the percussion member 36, this generating a sufficient quantity of energy to initiate the reaction of the hydrogen generating material 30. The balloon or other inflatable member 15 which has previously been freed from the confines of the upper canister portion 12, is then filled by means of the controlled flow of hydrogen gas from the enclosure 26, the hydrogen passing through the inflation tube member 20, and ultimately into the confines of the balloon 15. The tether line 18 will keep the inflated structure captive in the desired area if this is desirable.

The structure has significant advantages in that currently available materials render the system self-buoyant in nature, that is, the weight of the reacting material generates a sufficient quantity of hydrogen to provide a buoyant effect exceeding the weight of the material being utilized and consumed in the inflation process.

Various compounds, or blends of compounds, can be utilized for producing hydrogen gas, this being in a dry anhydrous system, the compounds or blends of compounds being arranged to react controllably toward sublimation. Generally speaking, blends of materials can be utilized which will produce hydrogen by the initial application of heat alone, the system being one in which the reaction is self-sustaining in nature. The endothermically decomposing material acts to absorb heat evolved from the decomposition of the exothermic reactant, and proper blends provide a controllable self-sustaining reaction rate to yield a continuous supply of reasonably cool hydrogen gas to the balloon or other inflatant system.

Absorbing the energy evolved from the hydrazine-bisborane decomposition to decompose $LiBH_4$ should result in a net decrease in the reaction temperature and subsequent evolved $H_2$. The extent of thermal decomposition of $LiBH_4$ is dependent upon the operating conditions including time, temperature, and amount of each reactant. The $LiBH_4$ decomposition is reported to proceed as follows:

$$24.8 \text{ kcal.} + LiBH_4 \rightarrow LiH + B + \tfrac{3}{2}H_2$$

Using the heats of formation of $LiBH_4$ and $LiH$ as $-46.4$ kcal./mol and $-21.6$ kcal./mol, respectively, the absorption in the decomposition of $LiBH_4$ would be 24.8 kcal./mol or 1.14 kcal./gram $LiBH_4$. However, these values are used cautiously because of the assumed products of decomposition, and because the $LiBH_4$ must be elevated to a high temperature to achieve any practical rate of decomposition. (Very slow decomposition of $LiBH_4$ has been reported at 280° C. but higher temperatures are required for a substantial, sustained extent of hydrogen release.) Since $LiBH_4$ has a fairly high specific heat, at least some heat will be absorbed in simply raising the temperature prior to decomposition.

To determine the correct proportions of hydrazine-bisborane and $LiBH_4$ in the gas generating mixture, it must be recognized that (1) work will be done by the liberated gas to expand the balloon and (2) excess energy will have to be maintained during decomposition of hydrazine-bisborane to achieve full decomposition of $LiBH_4$.

The work W, done in expanding the balloon, for example of volume V or 6 cubic feet of $1.7 \times 10^5$ cubic centimeters, is equal to $\int PdV$, assuming adiabatic expansion at atmospheric pressure, where 76.0 = height of column Hg at sea level, cm.,
13.6 = density of Hg, g./cm.$^3$,
980 = acceleration due to gravity, cm./sec.$^2$,
$1.7 \times 10^5$ = volume of 6 cubic foot balloon in cm.$^3$, then:
$W = 172.5 \times 10^9$ dyne-cm. = 1420 calories.

Assuming 2000 excess calories are normally required to maintain decomposition of $LiBH_4$ in a hydrogen generating system, then to determine the proportions of hydrazine-bisborane to $LiBH_4$ to yield a net heat of reaction of

TABLE I

| Type | Form | Name | Formula | Weight percent H |
|---|---|---|---|---|
| Exothermic | Solid | Hydrazine-bis-borane | $N_2H_4(BH_3)_2$ | 16.9 |
| | do | do | $N_2H_4(BH_2)_2$ | 11.0 |
| | do | Hydrazine-monoborane | $N_2H_4BH_3$ | 15.4 |
| | do | Ammonia borane | $NH_3BH_3$ | 19.5 |
| | Liquid | Diammoniate of ammonium hydrotriborate | $NH_4B_3H_8(NH_3)_2$ | 20.0 |
| Endothermic | Solid | Lithium borohydride | $LiBH_4$ | 14.8 |

A mixture of hydrazine-bisborane, as the exothermic material together with lithium borohydride as the endothermic material is the preferred reactant blend for use in connection with the present invention although other exothermic materials may be used instead of hydrazine-bisborane. This composition contains a high weight-percent of hydrogen, and the solid form lends itself to convenient packaging or encapsulation. Each of the compounds in the reactant mixture decomposes substantially independently, and the only interdependence in the entire system is that of the lithium borohydride for its heat of decompositions energy obtained from the hydrazine-bis(borane) decomposition.

The decomposition of the hydrazine-bisborane is reported to proceed as follows:

$$N_2H_4(BH_3)_2 \rightarrow 2BN + 5H_2 + 90 \text{ kcal.}$$

Using heats of formation of hydrazine-bisborane and boron nitride as $-30$ kcal./mol and $-60$ kcal./mol, respectively, the complete decomposition of hydrazine-bisborane or 1.51 kcal./gram hydrazine-bisborane.

4120 + 2000 calories, the following exemplary calculations are presented:

$$-90B + 24.8L = -6.12 \quad (1)$$

where
B = moles of hydrazine-bisborane, and
L = moles of $LiBH_4$,
$-90$ = heat liberated by B in kcal./mol,
24.8 = heat absorbed by L in kcal./mol,
$-6.12$ = net heat of reaction in kcal.

$$5B + 1.5L = 9.5 \quad (2)$$

where: 5 and 1.5 = the moles of $H_2$ produced per mole of B and L respectively and 9.5 moles of $H_2$ required to produce 6 ft.$^3$ of $H_2$ gas at estimated reaction efficiency of 80 percent.

Solving (1) and (2):

$$L = 3.18 \text{ moles and } B = 0.95 \text{ mole}$$

Thus, 0195 mole of $N_2H_4(BH_3)_2$ blended with 3.18 moles of $LiBH_4$ will decompose to liberate 6 cubic feet of hydrogen gas. Since 0.95 mole of hydrazine-bisborane equals 56.7 grams and 3.0 moles of LiBH$_4$ equals 69.4 grams the total weight W of chemicals will be 126.1 grams per unit. If 0.90=approximate density of hydrazine-bisborane and 0.66=approximate density of LiBH$_4$, the final density $p$ of the chemical mixture in our hydrogen generator will be approximately 0.765/cc.

To determine the length of our linear hydrogen as depicted as 25 in FIGURE 2, it can be calculated from $L = V_2/\pi r$. Since $V = w/p = 166$ cc. of chemicals and assuming a diameter, $d = 0.250$ inch = 0.6350 cm.; L = 508 cm. = 200 inches = 16.7 feet.

To estimate the increase in hydrogen gas temperature $\Delta T_f$, above ambient, consider the system in the initial state at high temperature and cool the system down to a low final temperature. In this cooling process 2000 calories are arbitrarily chosen as the amount of heat which needs to be extracted over and above the work W of expansion. Hence:

$$\Delta(T_f)(\Sigma C_s) = 1000$$

where,
$\Sigma C_s$ = total heat capacity of system,
Mylar, $C_s$ = 4.1 cal./deg.,
Hydrogen, $C_s$ = 36.8 cal./deg.,
Lead alloy, $C_s$ = 24.4 cal./deg.,
Glass, $C_s$ = 85.7 cal./deg., and
$\Delta T_f$ = 13.2C increase over ambient, neglecting heat capacity of residual chemicals and the effects of cooling due to transfer of heat to outside air.

It will be appreciated that the recommended hydrogen generating compositions, when properly blended in predetermined amounts to accommodate the conditions existing upon use. Furthermore these materials can be mixed together with certain diluents and/or inert binders such as powdered polystyrene, gelatin, or the like, in order to facilitate handling. These mixtures can then be subsequently compressed together, or extruded, and containers provided therefore, the containers being such that the thermal energy required to raise their temperature is not sufficiently high so as to adversely affect the reaction rates concerned. It will be appreciated that as an alternative, an in-situ arrangement can be prepared utilizing a high temperature synthetic foam, which can be used to secure the reactants to the inner wall of a balloon film along with a suitable tape. The hydrogen liberating material may also be placed within a tube prepared from polyethylene, polyvinyl chloride, lead alloy sheath or the like, the tube then being suspended from the balloon wall by means of a support web such as Mylar or similar tape. In either system, the inflation arrangement would resemble a fuse cord or the like. A graded composition could be utilized, if desired, as previously pointed out.

If desired as an additional control or moderating effect on the hydrogen generation system, a quantity of pelletized metals, foraminacious metals, or the like may be utilized in combination with the hydrogen liberating composition. Preferably, metals with high thermal conductivity such as copper, aluminium or silver in the form of wires, whiskers, tiny pellets, powder or like forms may be employed. The finely divided metal particles will provide the advantages of heat transfer, together with the moderation of the rate of reaction, both of these contributing to the stability of the reaction rate and consequently the stability of the system.

*Example 1.*—A 1:2 mole mixture of hydrazine-bisborane and lithium borohydride powders was made by gently stirring the materials together. This was then made into pellets by pressing to a shape approximately 15 mm. in diameter and 7 mm. thick. Four pellets, weighing approximately 5 grams were placed in a heavy wall test tube approximately 2½ centimeters in diameter and 90 centimeters long. A rubber stopper containing a 10 millimeter diameter glass tube was placed in the top of the test tube and through separate holes leads were made to a loop of nichrome wire which was placed in contact with the top pellet. The test tube was connected to Mylar spherical shaped balloon about 25.4 cm. diameter by a length of plasticized polyvinyl chloride tubing. The residual gas in the system consisted of dry nitrogen. On completion of the assembly of the equipment the hydrogen discharge was initiated by connecting the nichrome coil to a variable voltage on a 110-volt line which permitted the gradual application of voltage to the system. As the nichrome wire developed a red glow, a soft red glow developed in the pellets as the reaction occurred. The gas evolved carried with it fairly large quantities of very finely divided powder and filled the balloon to essentially its full size. From the position of the balloon after inflation, the presence of a gas lighter than air was indicated.

In other similar experiments conducted with the system, opening of the balloon to the air lead to rapid reaction and buring of the flammable gas contained within the balloon.

It will of course, be understood that various changes may be made in the form, details, arrangements and proportions of the parts without departing from the scope of our invention as set forth in the appended claims.

We claim:
1. Means for generating hydrogen upon application of heat to a self-sustaining reactant system comprising a thermally reactant blend of controllably exothermically and endothermically decomposable compounds, each being decomposable to liberate hydrogen gas and including:
   (a) an exothermically decomposable compound decomposable to liberate nascent hydrogen as a reaction product together with,
   (b) an endothermically decomposable compound decomposable to liberate nascent hydrogen as a reactant product, the arrangement being such that said reactant blend decomposes at a predetermined controllable self-sustaining rate.

2. The hydrogen generating means as defined in claim 1 being particularly characterized in that:
   (a) said reactant mixture is formed in tubular configuration, the tube having an axial length which is substantially greater than the cross-sectional dimension.

3. The hydrogen generating system as set forth in claim 1 being particularly characterized in that:
   (a) said exothermically decomposable compounds are selected from the group consisting of the reaction products of hydrazine and borane, and hydrazine and ammonia.

4. The hydrogen generating system as set forth in claim 3 being particularly characterized in that said exothermically decomposable compounds are selected from the group consisting of hydrazine-bisborane, hydrazine diborane, ammonia borane, and the diammoniate of ammonium hydrotriborate.

5. Inflatant means for inflating an inflatable structure with hydrogen comprising:
   (a) a self-sustaining reactant mixture including an exothermically decomposable compound decomposable to liberate hydrogen gas together with an endothermically sublimating compound decomposable to liberate hydrogen;
   (b) reaction enclosure means retaining a quantity of said reaction mixture in substantially continuous tubular form;
   (c) means for transmitting the hydrogen gas from said reaction enclosure to said inflatable structure.

6. The inflatant means as set forth in claim 5 being particularly characterized in that:
   (a) said reactant mixture is formed in tubular configuration, the tube having an axial length which is substantially greater than the cross-section dimension.

7. The inflatant means as set forth in claim 6 being particularly characterized in that:
   (a) ignition means are provided adjacent an axial end portion of said tubular arrangement of said reactant mixture for commencing the decomposition of said reactant mixture.

8. The inflatant means as set forth in claim 5 being particularly characterized in that:
   (a) a means are provided for moderating the rate of flow of hydrogen from said reaction enclosure to said inflatable structure.

9. Inflatant means for inflating an inflatable structure with hydrogen gas comprising:
   (a) a self-sustaining reactant mixture consisting essentially of a mixture of exothermically decomposable compounds decomposable to liberate hydrogen gas selected from the group consisting of hydrogen-bisborane, hydrogen-diborane, ammonia borane, and the diammoniate of ammonium hydrotriborate, together with;
   (b) and an endothermically decomposable compound decomposable to liberate hydrogen as a product of decomposition.

References Cited
UNITED STATES PATENTS

| | | | |
|---|---|---|---|
| 2,389,448 | 11/1945 | Mekler | 23—281 |
| 2,988,430 | 6/1961 | Horner | 23—281 |
| 3,323,873 | 6/1967 | Horn et al. | 23—281 |

MORRIS O. WOLK, *Primary Examiner.*

R. E. SERWIN, *Assistant Examiner.*

U.S. Cl. X.R.

23—211